(12) United States Patent
Kleinsasser

(10) Patent No.: US 7,178,484 B2
(45) Date of Patent: *Feb. 20, 2007

(54) APPARATUS FOR RAISING A SOW IN A FARROWING CRATE

(75) Inventor: Jonathan Kleinsasser, Ste. Agathe (CA)

(73) Assignee: Crystal Spring Hog Equipment Ltd., Ste. Agathe (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/933,472

(22) Filed: Sep. 3, 2004

(65) Prior Publication Data

US 2005/0126508 A1    Jun. 16, 2005

Related U.S. Application Data

(63) Continuation-in-part of application No. 10/453,926, filed on Jun. 4, 2003, now Pat. No. 6,623,819.

(51) Int. Cl.
*A01K 1/02* (2006.01)
(52) U.S. Cl. .................. 119/505; 119/503; 119/504; 119/506; 119/511
(58) Field of Classification Search ............ 119/505, 119/503, 506, 509, 511, 445, 446; *A01K 1/02*
See application file for complete search history.

(56) References Cited

U.S. PATENT DOCUMENTS 4,135,339 A * 1/1979 Pawlitschek ............... 52/660

(Continued)

FOREIGN PATENT DOCUMENTS

DE            43 20 345        12/1994

(Continued)

*Primary Examiner*—Peter M. Poon
*Assistant Examiner*—John D. Holman
(74) *Attorney, Agent, or Firm*—Adrian D. Battison; Michael R. Williams; Ryan W. Dupuis

(57) ABSTRACT

In a farrowing pen which includes a pit and over the pit a first floor portion on which the sow can stand and lie and two further floor portions on each side of the first floor portion for receiving piglets of the sow and confining walls for locating the sow on the first floor portion there is provided an apparatus for lifting the sow away from the piglets to prevent crushing. The apparatus includes a base carries above the pit on a cradle and a gas bag lift mechanism carried on the base above the manure and arranged to raise a plate carrying two parallel rails with the first floor portion thereon. An air valve extends through the flooring and is operated by pressure from contact with the sow for actuating the controlling the flow of the air. The rate of lifting is faster than the rate of lowering. A scissors lever arrangement mounted on the base above the pit acts to support and guide the floor on the bag.

15 Claims, 8 Drawing Sheets

U.S. PATENT DOCUMENTS

| | | | |
|---|---|---|---|
| 4,207,837 A * | 6/1980 | Schwartau et al. | 119/14.03 |
| 4,232,033 A | 11/1980 | Kramer et al. | |
| 4,294,195 A * | 10/1981 | Rodenberg et al. | 119/509 |
| 4,314,527 A * | 2/1982 | Shaw | 119/448 |
| 4,793,287 A * | 12/1988 | Hofmann | 119/505 |
| 5,372,091 A | 12/1994 | Rhodes | |
| 5,622,138 A | 4/1997 | Underhill | |
| 5,921,205 A | 7/1999 | Nooyen et al. | |
| 6,382,135 B1 * | 5/2002 | Van Grootheest et al. | 119/446 |
| 6,571,741 B1 | 6/2003 | Kongsgaard | |
| 6,823,819 B2 * | 11/2004 | Laramee et al. | 119/505 |

FOREIGN PATENT DOCUMENTS

| | | |
|---|---|---|
| EP | 360 308 | 3/1990 |
| GB | 932189 | 7/1963 |
| GB | 0573934 A1 | 6/1992 |

* cited by examiner

APPARATUS FOR RAISING A SOW IN A FARROWING CRATE

This application is a continuation-in-part application of application Ser. No. 10/453,926, filed Jun. 4, 2003 and now U.S. Pat. No. 6,623,819.

This invention relates to an apparatus for raising a sow in a farrowing crate relative to a floor for the piglets for reducing piglet mortality by crushing as the sow lies or treads during movement to access feed and water.

BACKGROUND OF THE INVENTION

In British patent 932189 (Hodgkinson) issued in 1963 is shown a farrowing crate or pen for sows where the level of the outer floor section which carries the piglets can be raised and lowered in order to move the piglets away from danger from the sow when the sow is standing. Thus when the sow lies down, the piglets are kept away from the height of the floor level on which the sow lies to reduce the possibility of crushing.

This arrangement uses a light beam and electric switches to detect the movement of the sow and uses a complex lifting arrangement. The device is currently not available on the market.

U.S. Pat. No. 4,793,287 of Hoffmann issued in 1988 discloses a modified arrangement in which lifting and lowering of the piglet floor section is actuated by an alternative arrangement. However again this construction is disadvantageous and is not available in the market place.

In German Application DE 43 20 345 (Ulrich) published $22^{nd}$ Dec. 1994 is disclosed a farrowing pen with a base frame which is laid on a floor with an air bag carried on the base frame which can be actuated to raise a sow support floor section mounted on top of the base frame on levers which swing the floor section longitudinally and upwardly. The lifting action is controlled by a valve which actuated by the sow lying down on the valve or standing up from the valve.

In European Application 360 308 (Geerkens) published 28 Mar. 1990 is disclosed a farrowing pen with a lift frame mounted over a sow support floor section for lifting the floor section upwardly on two motors and associated screws, one at each end. The lifting action is controlled by a photo-electric cell which detects lying or standing of the sow.

SUMMARY OF THE INVENTION

It is one object of the present invention, therefore, to provide an improved apparatus for raising and lowering a sow in a farrowing pen.

According to one aspect of the invention there is provided a farrowing pen for sows comprising:

a pit for manure having a pit floor and pit sides with side floor portions above the pit on each side of the pit;

a floor assembly for receiving the sow and piglets which includes a first floor portion on which the sow can stand and lie and two second floor portions each on a respective side of the first floor portion for receiving piglets of the sow;

the first floor portion and the two second floor portions being arranged to span the pit;

confining walls for locating the sow on the first floor portion;

a support element for the first floor portion;

the support element including a base member and a lift mechanism carried on the base member, operated by a power source, arranged to raise and lower the first floor portion relative to the base member between a lowered position in which the first floor portion is at a generally common height with the second floor portions to allow the piglets to access the first floor portion and the sow thereon and a raised position in which the first floor portion is at a height above the second floor portions sufficient to prevent the piglets on the second floor portions from accessing the first floor portion;

and a sensor responsive to movement of the sow tending to stand to actuate the lift mechanism to operate the lift mechanism;

the support element comprising a frame mounted on each of the side floor portions on respective sides of the pit so as to span the pit;

the frame being mounted so as to extend underneath the first floor portion;

the frame supporting the base member therefrom at a position underlying the first floor portion and overlying the pit such that the base member is free from support from the floor of the pit.

Preferably the base member is carried on the frame so as to be suspended underneath the frame.

Preferably the base member is located at a height within the pit and below the side floor portions.

Preferably the support element carries a guide system for guiding vertical movement of the first floor portion and for maintaining the first floor portion horizontal.

Preferably the guide system is carried on the base member.

Preferably the guide system comprises two pairs of levers arranged in a scissors arrangement with each pair on a respective side of the first floor portion.

Preferably the lift mechanism comprises an inflatable air bag carried on the base member between the pairs of levers.

Preferably the lift mechanism comprises an inflatable air bag carried on the base member with the guide system.

According to a second aspect of the invention there is provided a farrowing pen for sows comprising:

a pit for manure having a pit floor and pit sides with side floor portions above the pit on each side of the pit;

a floor assembly for receiving the sow and piglets which includes a first floor portion on which the sow can stand and lie and two second floor portions each on a respective side of the first floor portion for receiving piglets of the sow;

the first floor portion and the two second floor portions being arranged to span the pit;

confining walls for locating the sow on the first floor portion;

a support element for the first floor portion;

the support element including a base member and a lift mechanism carried on the base member, operated by a power source, arranged to raise and lower the first floor portion relative to the base member between a lowered position in which the first floor portion is at a generally common height with the second floor portions to allow the piglets to access the first floor portion and the sow thereon and a raised position in which the first floor portion is at a height above the second floor portions sufficient to prevent the piglets on the second floor portions from accessing the first floor portion;

and a sensor responsive to movement of the sow tending to stand to actuate the lift mechanism to operate the lift mechanism;

the support element comprising a frame mounted on each of the side floor portions on respective sides of the pit so as to span the pit;

the frame being mounted so as to extend underneath the first floor portion;

the frame supporting the base member therefrom at a position underlying the first floor portion and overlying the pit such that the base member is free from support from the floor of the pit;

a guide system for guiding vertical movement of the first floor portion and for maintaining the first floor portion horizontal;

wherein the base member is carried on the frame so as to be suspended underneath the frame;

and wherein the base member carries the lift mechanism and the guide system.

Preferably the base member is located at a height within the pit and below the side floor portions.

Preferably the guide system comprises two pairs of levers arranged in a scissors arrangement with each pair on a respective side of the first floor portion.

Preferably the lift mechanism comprises an inflatable air bag carried on the base member between the pairs of levers.

According to a third aspect of the invention there is provided a farrowing pen for sows comprising:

a pit for manure having a pit floor and pit sides with side floor portions above the pit on each side of the pit;

a floor assembly for receiving the sow and piglets which includes a first floor portion on which the sow can stand and lie and two second floor portions each on a respective side of the first floor portion for receiving piglets of the sow;

the first floor portion and the two second floor portions being arranged to span the pit;

confining walls for locating the sow on the first floor portion;

a support element for the first floor portion;

the support element comprising a frame mounted on each of the side floor portions on respective sides of the pit so as to span the pit underneath the first floor portion and a base member carried by the frame underlying the first floor portion and overlying the pit such that the base member is free from support from the floor of the pit;

the support element including a gas bag lift mechanism carried on the base member, operated by a compressed gas source, arranged to raise and lower the first floor portion relative to the base member between a lowered position in which the first floor portion is at a generally common height with the second floor portions to allow the piglets to access the first floor portion and the sow thereon and a raised position in which the first floor portion is at a height above the second floor portions sufficient to prevent the piglets on the second floor portions from accessing the first floor portion;

a sensor responsive to movement of the sow tending to stand to actuate the lift mechanism to operate the lift mechanism;

and a guide system carried on the base member for guiding vertical movement of the first floor portion and for maintaining the first floor portion horizontal.

Preferably the base member is located at a height within the pit and below the side floor portions.

Preferably the guide system comprises two pairs of levers arranged in a scissors arrangement with each pair on a respective side of the first floor portion.

According to a fourth aspect of the invention there is provided a farrowing pen for sows comprising:

a floor assembly for receiving the sow and piglets which includes a first floor portion on which the sow can stand and lie and two second floor portions each on a respective side of the first floor portion for receiving piglets of the sow;

confining walls for locating the sow on the first floor portion;

a support element for the first floor portion;

the support element including a support frame and a lift mechanism carried on the support frame, operated by a power source, arranged to raise and lower the first floor portion relative to the support frame between a lowered position in which the first floor portion is at a generally common height with the second floor portions to allow the piglets to access the first floor portion and the sow thereon and a raised position in which the first floor portion is at a height above the second floor portions sufficient to prevent the piglets on the second floor portions from accessing the first floor portion;

and a sensor responsive to movement of the sow tending to stand to actuate the lift mechanism to operate the lift mechanism;

the support frame including frame portions mounted at respective ends of the first floor portion and located above the first floor portion;

the lift mechanism including a pneumatic drive element arranged to actuate pulling on four cables arranged adjacent respective corners of the floor portion such that the pneumatic drive element effects simultaneous pulling on each of the cables to simultaneously lift the four corners of the first floor portion.

Preferably the pneumatic drive element comprises a gas bag.

Preferably the pneumatic drive element comprises a single gas bag.

Preferably the pneumatic drive element actuates a lever turning two pulleys each carrying a pair of cables.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
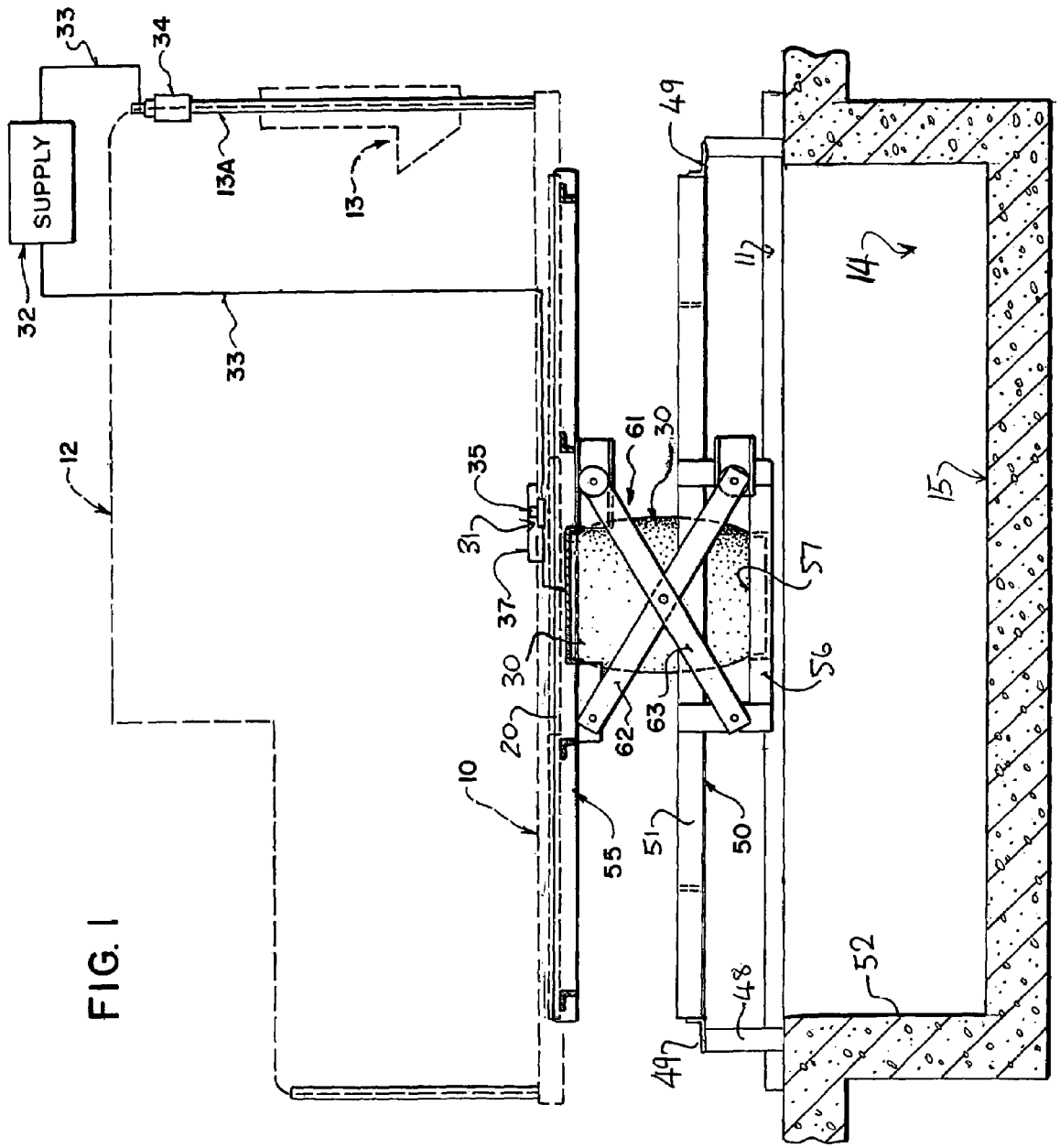
FIG. 1 is a side elevational view through a farrowing pen showing the lifting apparatus according to the present invention showing the sow lift mounted on raised legs above the barn floor and with the sow floor portion in the raised position.

In FIGS. 1 to 5, 8 and 9 is shown the construction of the present invention somewhat schematically showing the operation of the device and the basic construction of the device.

A farrowing crate thus comprises a first floor section 10 for receiving the sow. The floor section 10 can be formed from many different types of flooring all of which are presently commercially available including plastics flooring, cast iron flooring and flooring of plastics coated metal. The floor section has a width and length sufficient to receive the sow and is in some cases formed from panels which are arranged end to end to form the complete floor section. On each side of the first floor section is provided two second floor sections 11 which are arranged for receiving the piglets. The characteristics of the floor therefore are significantly different and they may include heating pads and the like to properly provide the required situation for the piglets including the required ambient temperature.

The second floor sections 11 are arranged so that a next adjacent farrowing pen provides an adjacent floor section 11A with a further floor section 10A for the next adjacent sow.

Each first floor section 10 includes a crate 12 providing confining walls which locate the sow front and back and side to side so that the sow is maintained in the area on top of the floor and is prevented from moving to the sides into the area of the floor section 11 or out of the pen in front to rear direction. The walls are shown only schematically since these are well known to one skilled in the art and the construction can vary depending upon the particular manufacture of the farrowing crate. A feeder 13 is provided on a front wall 13A for providing feed and water to the sow when required. In order to take the feed and water, the sow stands on the floor section 10 to feed voluntarily and then to lie down when feeding is complete.

The floor sections 10 and 11 are arranged over a pit 14 having a pit floor 15 onto which manure collects from the pens by passing through the flooring which is suitably perforated. The depth of the pit is generally of the order of 18 to 24 inches which allows manure to collect in the bottom of the pit preferably up to a depth of no more than 9 to 15 inches for collection through a collection system, although in some rare cases of malfunction filling the pit.

The floor section 10 is carried on a pair of side rails 16 which provide a top face 17 onto which the flooring rests so that it spans across the parallel rails 16 and extends along the length of the rails and outwardly beyond ends 18 of the rails to the front and rear of the pen. Different types of flooring rest upon the rails 16 in a different manner as required by the construction of the flooring and some includes lips which engage over the top face 17 and others sit within the top face 17.

The rails 16 are carried on a plate 20 which spans across the width of the floor section 10 and extends along a part of the length of the rails 16. The rails are bolted to the plate 20 or may be welded to the plate along the side edges of the plate with the plate having sufficient length to provide support for the rails 16 to prevent bending, twisting or tilting.

The top plate 20 is supported on an inflatable gas bag 30. Such gas bags are commercially available and are conventionally used in truck suspension systems but many different types of such bags having different inflation and expansion parameters are available from commercial suppliers.

A commercially available valve 31 is provided which can be operated to control air from an air supply 32 to a regulator valve 34 through a line 33 and from the valve 31 into the gas bag 30. The valve is normally maintained closed so that the bag is uninflated. The valve 31 includes an actuator which projects upwardly as a stud or button 35 extending through the slot between two of the rails 10B (FIG. 5) of the floor section 10. In some cases it is necessary to cut out a part or one of the rails or one of the parts of the flooring so as to allow the actuator pin to project through the floor into a position above the height of the flooring.

The pin is covered by a channel member 37 which sits on top of the pin and thus provides an elongate plate sitting on top of the floor section 10 slightly raised from the floor. The plate has one end 38 (FIG. 4) resting on the floor and the pin holds the other end upwardly from the floor so that the plate can be pushed down toward the floor by pressure from the sow. Thus the valve actuator pin 35 is directly actuated by pressure from the sow and the channel provides an increased area over which the pressure from the sow can be applied causing the actuation of the valve. The channel 37 has depending side walls 39 which project between the rails 10B of the flooring to hold the plate in place. The plate may be attached to the top of the pin so that it cannot slide forwards and rearwards under forces from the sow.

The positioning of the plate is such that it is under the chest area of the sow so as to provide effective contact when the sow lies down.

The valve 31 thus can be operated by release of pressure caused by the animal tending to stand to allow the supply of air from the supply 32 into the gas bag 30 expanding the gas bag and causing the support for the floor to move upwardly to the maximum height. This movement is effected relatively quickly so that the sow is lifted away from the side portions 11 of the flooring to the raised height while deterring any piglets from entering onto the center portion 10 of the flooring to be raised therewith.

Figure 2:
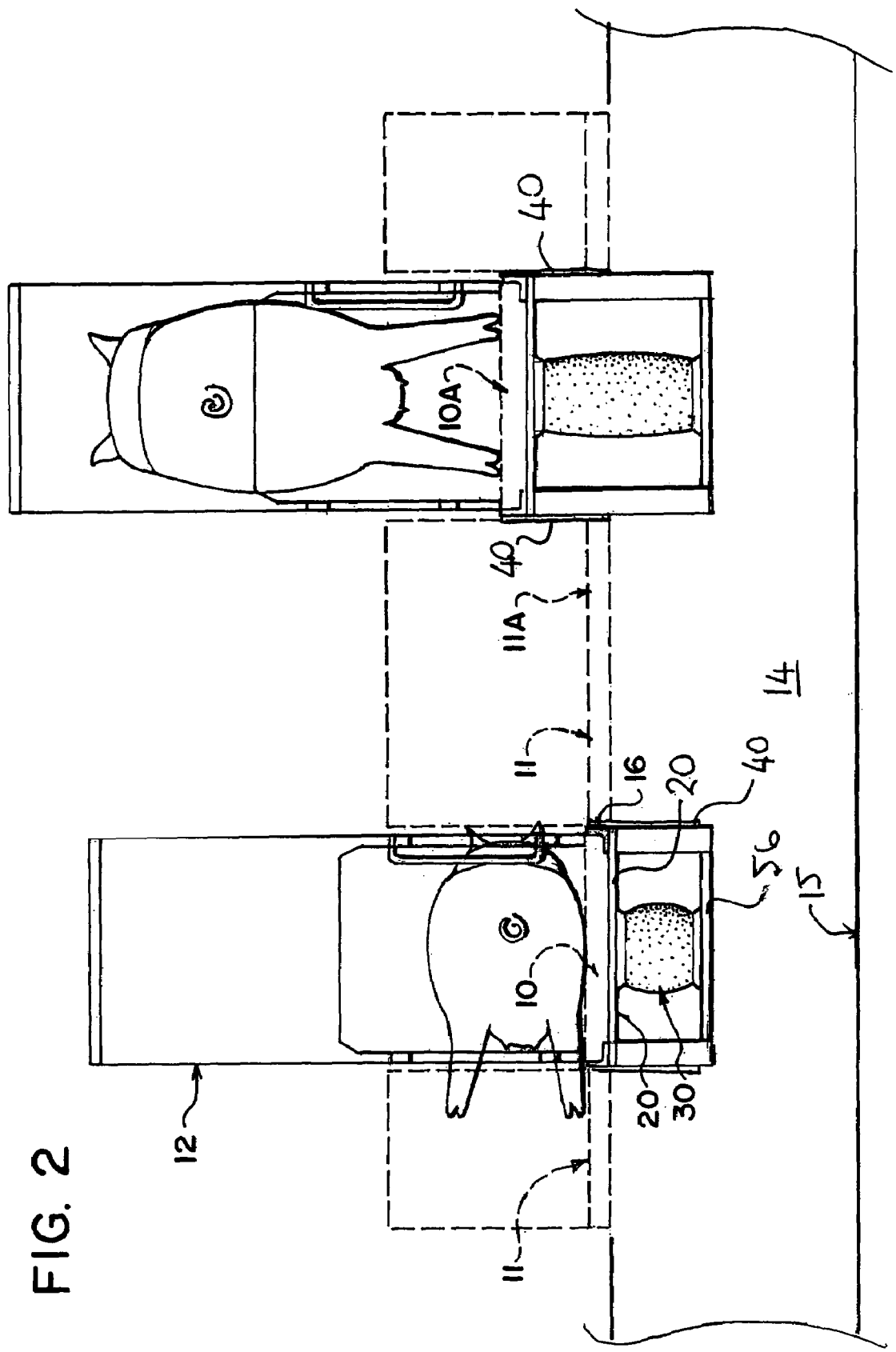
FIG. 2 is a rear elevational view of two farrowing pens of FIG. 1 arranged side by side.
Figure 3:
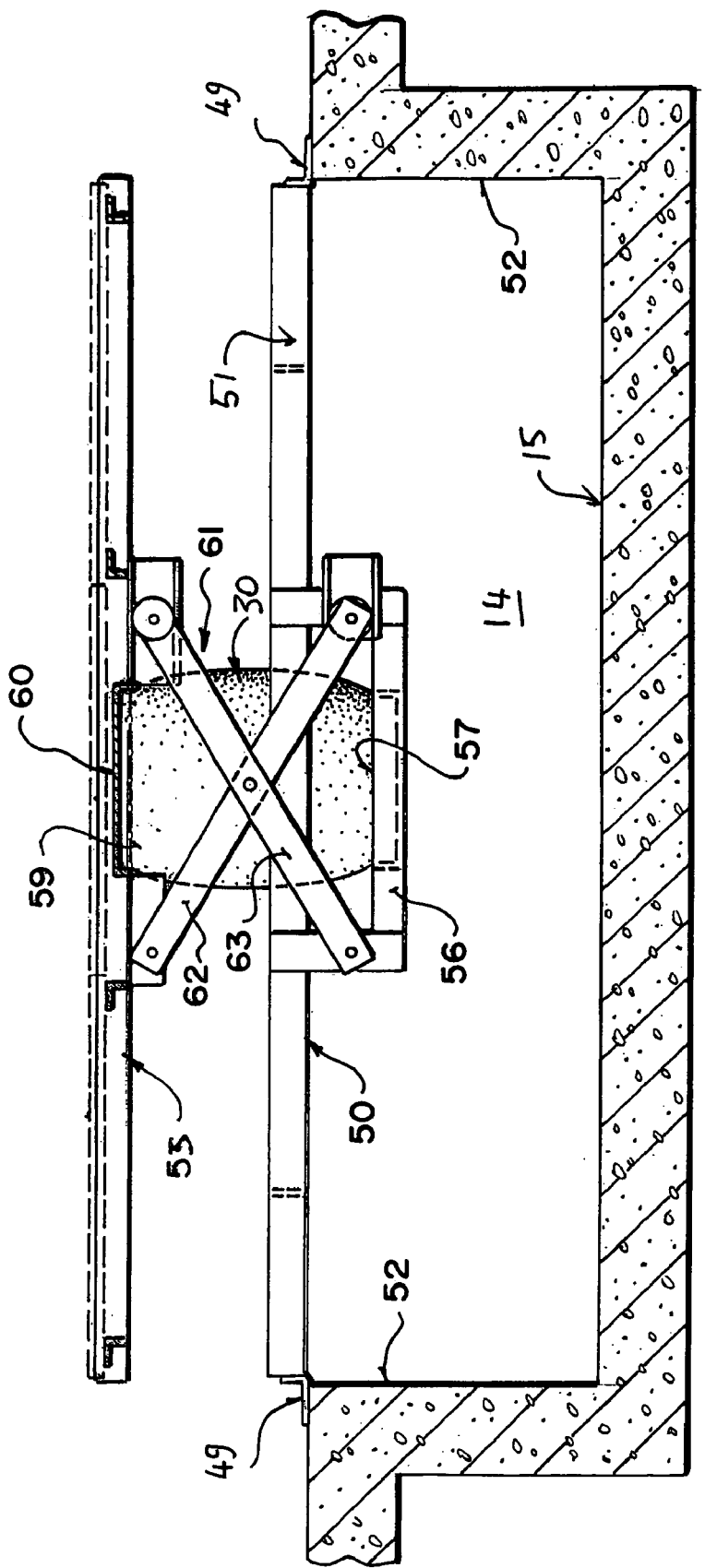
FIG. 3 is a side elevational view similar to that of FIG. 1 showing the sow lift mounted directly on the barn floor and with the sow floor portion in the raised position.
Figure 4:
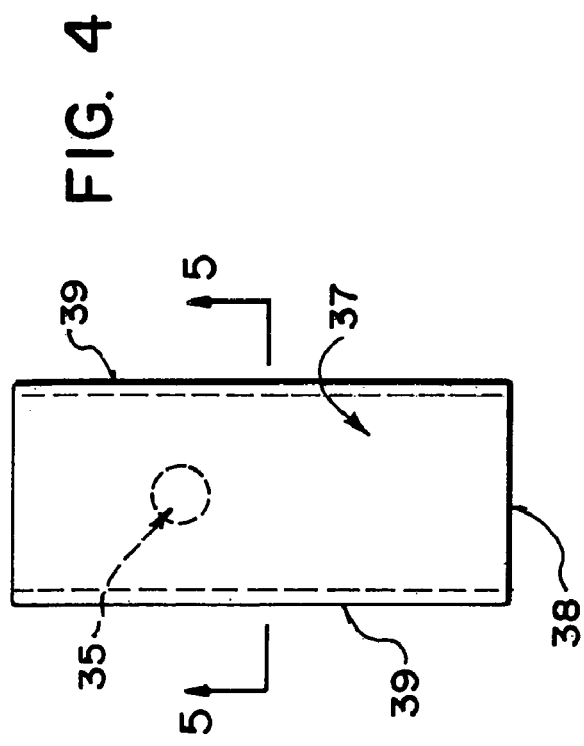
FIG. 4 is a top plan view of a portion only of the farrowing pen of FIG. 1 showing the actuating valve.
Figure 5:
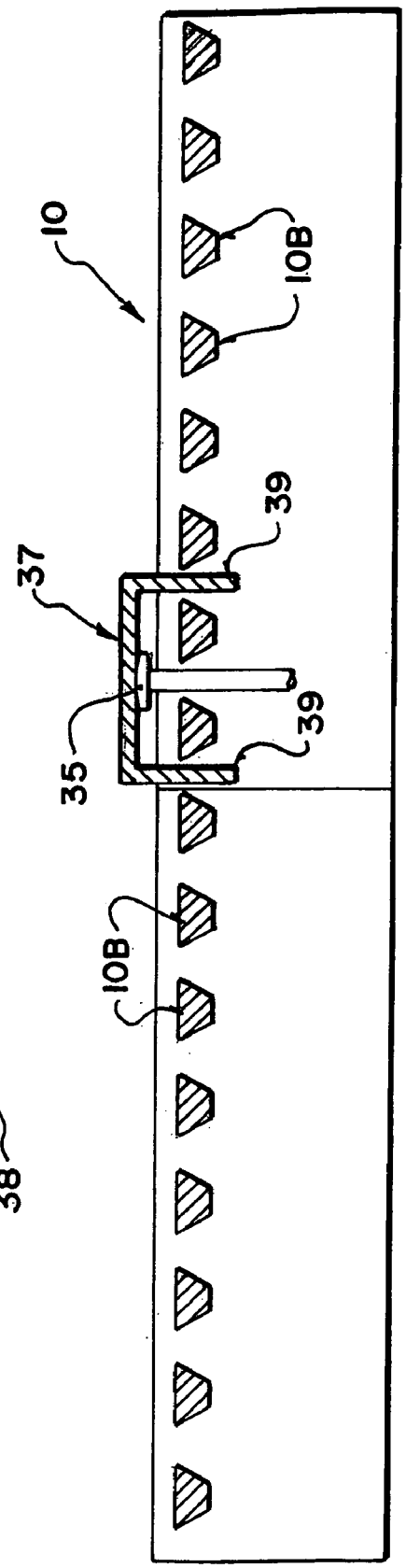
FIG. 5 is a cross sectional view along the lines 5—5 of FIG. 4 showing the actuating valve.

As shown in FIG. 2, on each side of the flooring portion 10 is provided a panel 40 so as to close off the area on either side of the flooring portion 10 to prevent the piglets from entering into the area underneath the flooring portion 10.

When the sow lies down, this applies pressure onto the plate 37 actuating the valve so as to close off supply of air from a supply 32 and acting to release the air from the gas bag through a discharge orifice. The discharge is arranged so that the floor 10 moves relatively slowly in the downward direction so that the sow is given time to lie down before the floor reaches the lowered position at the height of the floor 11.

The device is thus arranged to save piglets from the first second of birth to the day they get weaned. This unit works on air only. The unit is arranged to be installed beneath the sow's floor only, in existing barns or in new barn construction. Every farrowing barn operation will benefit from this invention.

Even if the sow only sits up, the actuator valve on this unit will be activated and it only takes approximately nine seconds for the sows to raise up to twelve inches. This does not give the piglets enough time to get beneath the sow if she decides to lay down again. Once the sow is standing the unit is fully raised, her piglets are now confined only on the second floor sections so she can eat and drink the sufficient amount she needs to conserve her body fat. If the sows eat well this means they will also milk well and that is what is required to wean big, nice healthy pigs. The time it takes for this unit to retract after the sow lays down again is approximately twenty seconds. This is sufficient time for most sows to have laid on their side again and by not having any piglets in her way so that the amount of laid-on and stepped-on pigs will be reduced tremendously.

This unit will also give that extra time for the low viability piglets to gain strength which normally they fall over beneath the sow while she is standing and get crushed by her because they are not strong enough to get out of her way. This unit is a low cost and low maintenance device for what it is capable of saving. Pre-weaning mortality will decrease and pigs weaned per mated female per year will increase. At weaning time the advantage of this unit is having a shut off valve in the farrowing room which means the sows will get out of the crates as normal. When comes time to pick up the weanlings, one valve that supplies the air in that room can be operated and this means all the weanlings in each of these pens are confined to their storage space, this way it becomes one third of the area to catch them. This unit is efficient by itself and also efficient for the work load for hog producers.

The structure which carries the air bag 30 is supported from the sides of the pit rather than from the floor of the pit. This allows the floor of the pit to be open for the use of a conventional scraper which moves along the pit for assisting in manure removal. The support is of a low profile construction which allows the bottom of the bag and the bottom of the guide mechanism to be raised as high as possible from the floor of the pit thus keeping the available depth of the pit for manure to a maximum.

Thus the system comprises a cradle 50 which is defined by a pair of parallel rails 51 connected by a series of cross members 51A is mounted on the end plates 49 attached to the floor at the sides 52 of the pit 15 so that the rails of the cradle spans the width of the pit. The cradle provides a support for the first floor section 10 on which the sow is supported. The first floor section 10 is carried on the rectangular support plate 20.

At the center section of the cradle 50 carried on the rails 51 is provided a dropped support table 56 which is carried at a height below the rails 51 and thus below the top of the pit and below the floor. The table 56 carries the bottom end 57 of the gas bag 30. The upper end 59 of the gas bag co-operates with a receptacle 60 at the center of the rectangular support plate 20 for the first floor section 10. The gas bag thus provides motive force for raising and lowering the rectangular floor support section 10.

The floor support section 10 is guided so that it is maintained horizontal by a scissors lift mechanism generally indicated at 61 which comprises diagonal link arms 62 and 63 which pivot at one end and slide at the other end so as to maintain the movement of the floor support section in a vertical direction and parallel to the cradle 50.

Figure 6:
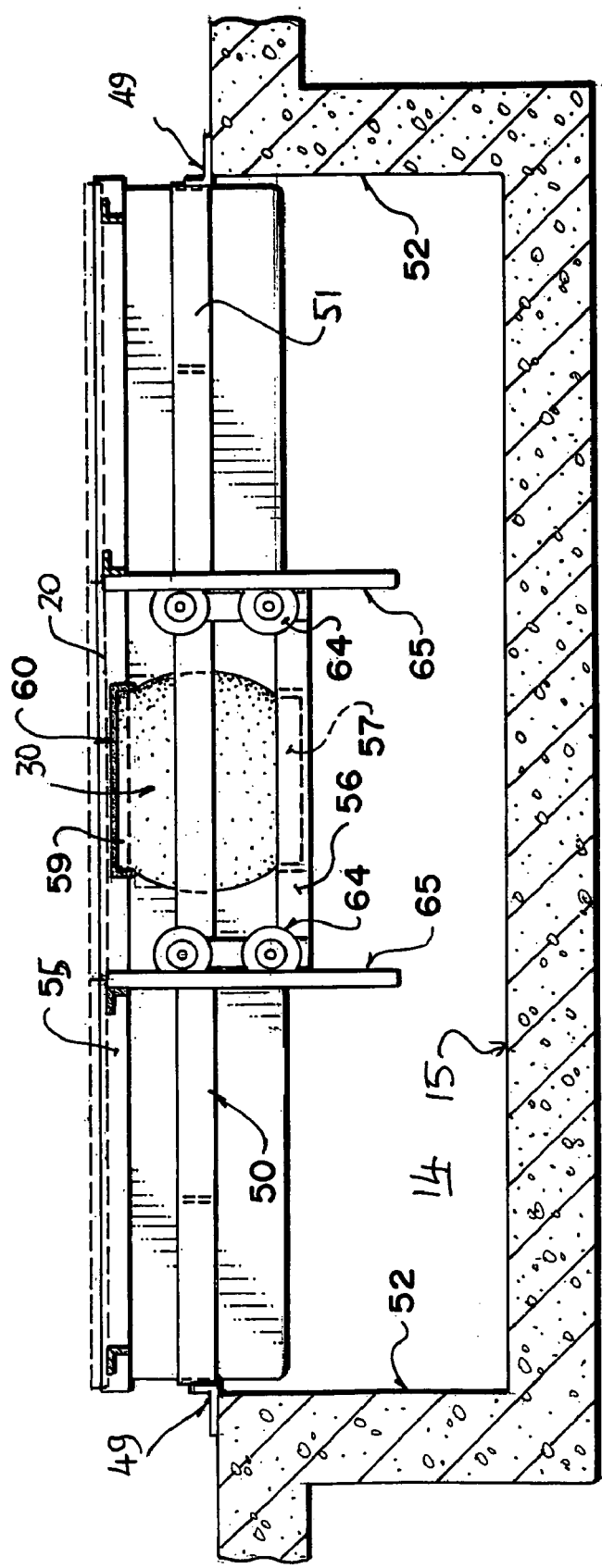
FIG. 6 is a longitudinal cross sectional view of a second embodiment of a sow lift mechanism according to the present invention.

In an alternative shown in FIG. 6, the vertical movement of the plate 20 and therefore the floor 10 is controlled and guided by rollers 64 which roll in vertical guide tracks 65. The rollers are carried on the cradle 50 and co-operate with the guide tracks 65 in the form of posts which extend downwardly from the underside of the floor support plate 20.

The mechanism shown in this embodiment can be modified but the principle involved is that the structure is supported as a cradle from the side walls of the pit and is formed as a low profile construction so that it is as close as possible to the underside of the floor maximizing the area in the pit for manure.

Figure 7:
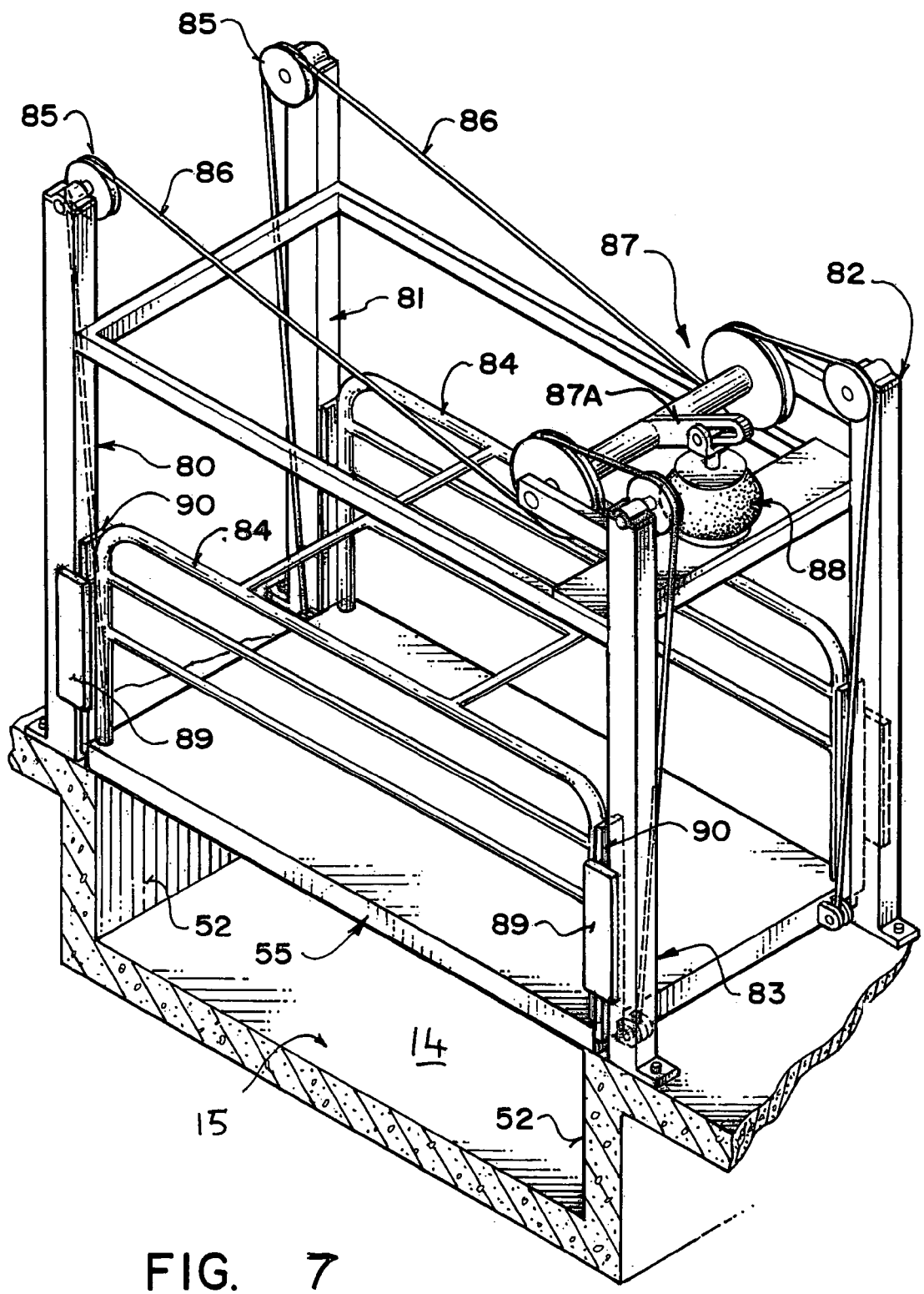
FIG. 7 is an isometric sketch of a third embodiment of a sow lift mechanism according to the present invention.

In FIG. 7 is shown a yet further arrangement which is mounted wholly above the pit. In this arrangement there are provided four posts 80, 81, 82 and 83 which are arranged at the four corners of the first floor section supporting the sow. Side walls 84 of the farrowing crate contain the sow on the floor section. At the top of each post is provided a pulley 85 with a cable 86 which extends downwardly from the pulley to the respective corner of the rectangular frame providing support for the floor section. The cables 86 are pulled by an actuating system generally indicated at 87 which includes a central single gas bag 88 actuating a lever 89 to the drive a cable pulling system providing equal pull on each of the cables thus tending to lift the rectangular frame 55 in a vertical direction. Side to side and end to end swinging movement of the rectangular frame is prevented by slide guides 89 provided on the post which co-operate with projecting elements 90 provided on the frame 55 or on the confining rolls 84. The guide arrangements can of course vary and can include rollers or wheels which run in a suitable track and the selection of which element carries the track is of course of a minor nature.

The lifting system using the air bag is advantageous as previously described in view of the simple nature of the actuating system which allows the pressure switch to be operated directly by the pressure from the body of the sow.

In all cases the frame carries the depending side walls 40 which prevent access to the pit from the piglets so that they are protected by the side walls 40 which thus form a vertical protection wall as the frame carrying the sow and the confining walls is lifted.

Figure 8:
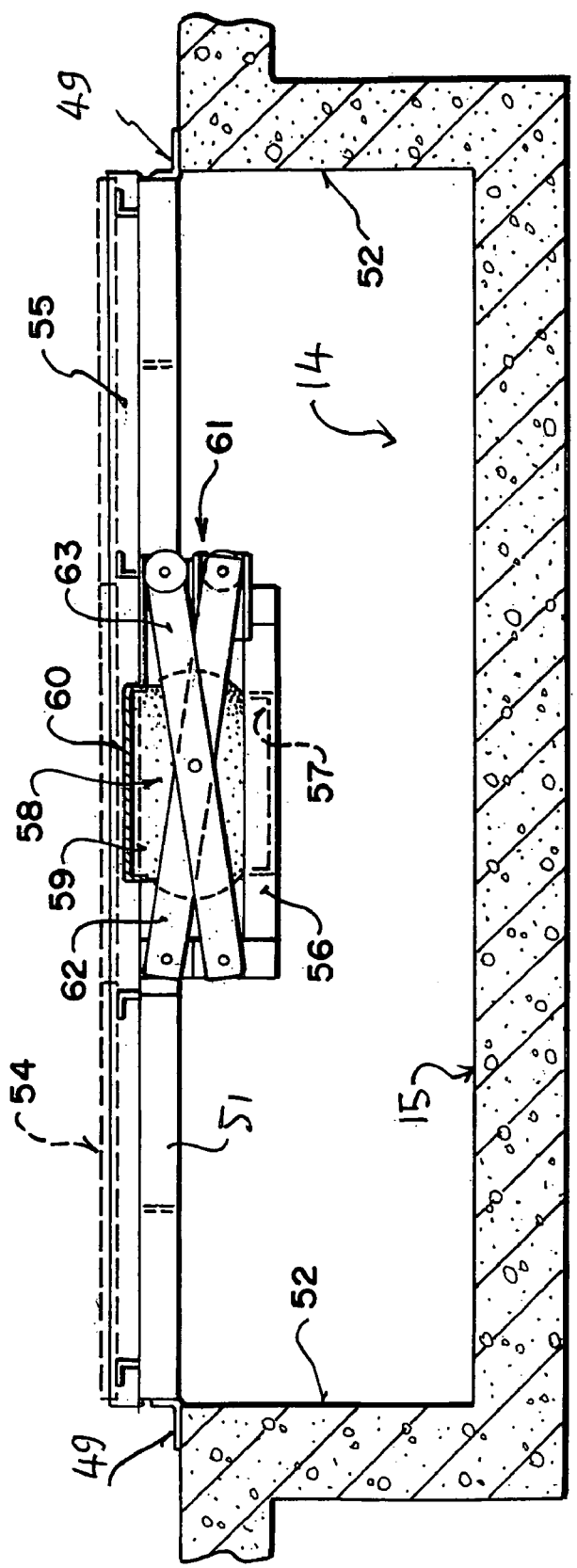
FIG. 8 is a longitudinal cross sectional view of the embodiment of the sow lift mechanism of FIG. 3 in the lowered position of the sow floor portion.
Figure 9:
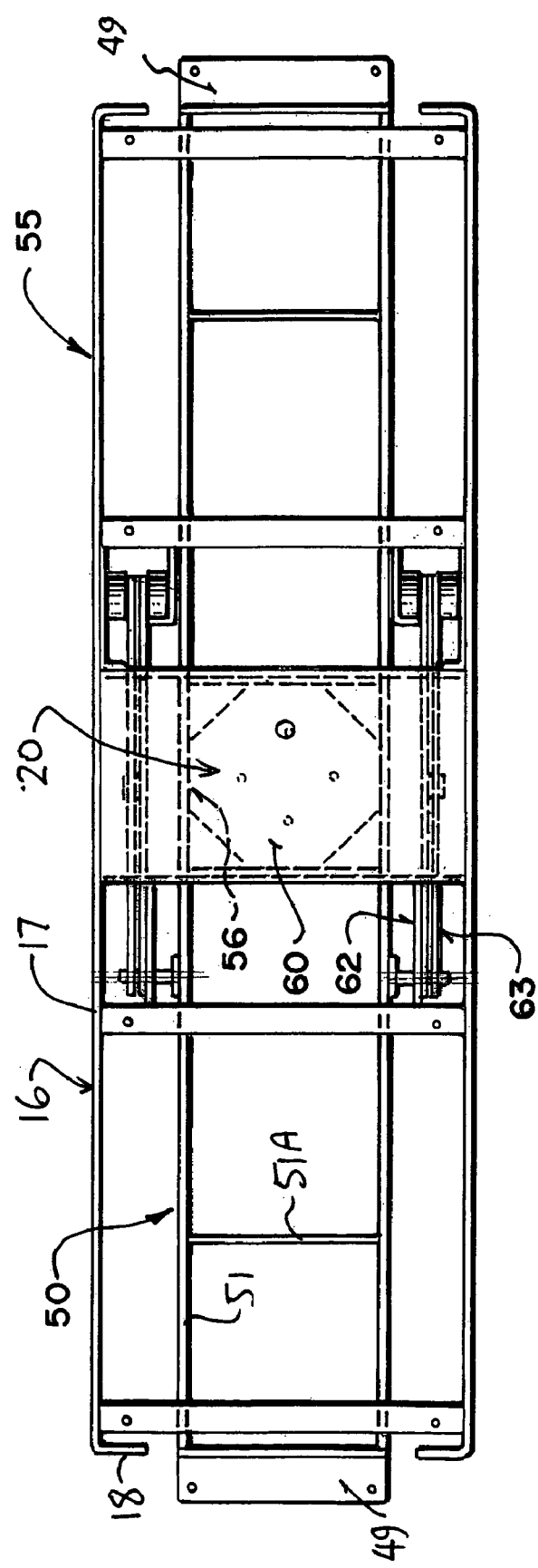
FIG. 9 is a top plan view the second embodiment of a sow lift mechanism of FIG. 3.

In FIG. 8, the rails 51 and the mounting plates 49 on the sides of the pit are mounted directly on the floor on each side of the pit so that the floor 10 is at the same height as or only slightly higher than the floor sections 11. In this embodiment therefore the dropped plate 56 is dropped into the pit below the top of the pit but above the floor of the pit. In some cases this is disadvantageous in that there may not be sufficient room in the pit to accommodate the filling of the pit to its highest level or the passage of the scraper through the pit. In this case the rails 51 and the end plates 49 may be mounted on legs 48 having the bottom of the legs on the floor and the top of the legs under the end plates 49. This raises the floor 10 in its lowered position to a height a few centimetres above the floor 11. This height is insufficient to interfere with the piglets accessing the floor 10 and the sow and yet reduces the amount of lift necessary from the lowered position to the raised position, which must be at a height to prevent the piglets accessing the floor 10. The legs 48 may be of sufficient length to hold the base plate 57 and the whole of the cradle out of the pit to ensure that it is not accessed or contaminated by contact with the manure.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

The invention claimed is:

1. A farrowing pen for sows comprising:
   a pit for manure having a pit floor and pit sides with side floor portions above the pit on each side of the pit;
   a floor assembly for receiving the sow and piglets which includes a first floor portion on which the sow can stand and lie and two second floor portions each on a respective side of the first floor portion for receiving piglets of the sow;
   the first floor portion and the two second floor portions being arranged to span the pit;
   confining walls for locating the sow on the first floor portion;
   a support element for the first floor portion;

the support element including a base member and a lift mechanism carried on the base member, operated by a power source, arranged to raise and lower the first floor portion relative to the base member between a lowered position in which the first floor portion is at a generally common height with the second floor portions to allow the piglets to access the first floor portion and the sow thereon and a raised position in which the first floor portion is at a height above the second floor portions sufficient to prevent the piglets on the second floor portions from accessing the first floor portion;

and a sensor responsive to movement of the sow tending to stand to actuate the lift mechanism to operate the lift mechanism;

the support element comprising a frame mounted on each of the side floor portions on respective sides of the pit so as to span the pit;

the frame being mounted so as to extend underneath the first floor portion;

the frame supporting the base member therefrom at a position underlying the first floor portion and overlying the pit such that the base member is free from support from the floor of the pit.

2. The farrowing pen according to claim 1 wherein the base member is carried on the frame so as to be suspended underneath the frame.

3. The farrowing pen according to claim 1 wherein the base member is located at a height within the pit and below the side floor portions.

4. The farrowing pen according to claim 1 wherein the support element carries a guide system for guiding vertical movement of the first floor portion and for maintaining the first floor portion horizontal.

5. The farrowing pen according to claim 4 wherein the guide system is carried on the base member.

6. The farrowing pen according to claim 4 wherein the guide system comprises two pairs of levers arranged in a scissors arrangement with each pair on a respective side of the first floor portion.

7. The farrowing pen according to claim 6 wherein the lift mechanism comprises an inflatable air bag carried on the base member between the pairs of levers.

8. The farrowing pen according to claim 5 wherein the lift mechanism comprises an inflatable air bag carried on the base member with the guide system.

9. A farrowing pen for sows comprising:

a pit for manure having a pit floor and pit sides with side floor portions above the pit on each side of the pit;

a floor assembly for receiving the sow and piglets which includes a first floor portion on which the sow can stand and lie and two second floor portions each on a respective side of the first floor portion for receiving piglets of the sow;

the first floor portion and the two second floor portions being arranged to span the pit;

confining walls for locating the sow on the first floor portion;

a support element for the first floor portion;

the support element including a base member and a lift mechanism carried on the base member, operated by a power source, arranged to raise and lower the first floor portion relative to the base member between a lowered position in which the first floor portion is at a generally common height with the second floor portions to allow the piglets to access the first floor portion and the sow thereon and a raised position in which the first floor portion is at a height above the second floor portions sufficient to prevent the piglets on the second floor portions from accessing the first floor portion;

and a sensor responsive to movement of the sow tending to stand to actuate the lift mechanism to operate the lift mechanism;

the support element comprising a frame mounted on each of the side floor portions on respective sides of the pit so as to span the pit;

the frame being mounted so as to extend underneath the first floor portion;

the frame supporting the base member therefrom at a position underlying the first floor portion and overlying the pit such that the base member is free from support from the floor of the pit;

a guide system for guiding vertical movement of the first floor portion and for maintaining the first floor portion horizontal;

wherein the base member is carried on the frame so as to be suspended underneath the frame;

and wherein the base member carries the lift mechanism and the guide system.

10. The farrowing pen according to claim 9 wherein the base member is located at a height within the pit and below the side floor portions.

11. The farrowing pen according to claim 9 wherein the guide system comprises two pairs of levers arranged in a scissors arrangement with each pair on a respective side of the first floor portion.

12. The farrowing pen according to claim 11 wherein the lift mechanism comprises an inflatable air bag carried on the base member between the pairs of levers.

13. A farrowing pen for Bows comprising:

a pit for manure having a pit floor and pit sides with side floor portions above the pit on each side of the pit;

a floor assembly for receiving the sow and piglets which includes a first floor portion on which the sow can stand and lie and two second floor portions each on a respective side of the first floor portion for receiving piglets of the sow;

the first floor portion and the two second floor portions being arranged to span the pit;

confining walls for locating the sow on the first floor portion;

a support element for the first floor portion;

the support element comprising a frame mounted on each of the side floor portions on respective sides of the pit so as to span the pit underneath the first floor portion and a base member carried by the frame underlying the first floor portion and overlying the pit such that the base member is free from support from the floor of the pit;

the support element including a gas bag lift mechanism carried on the base member, operated by a compressed gas source, arranged to raise and lower the first floor portion relative to the base member between a lowered position in which the first floor portion is at a generally common height with the second floor portions to allow the piglets to access the first floor portion and the sow thereon and a raised position in which the first floor portion is at a height above the second floor portions sufficient to prevent the piglets on the second floor portions from accessing the first floor portion;

a sensor responsive to movement of the sow tending to stand to actuate the lift mechanism to operate the lift mechanism;

and a guide system carried on the base member for guiding vertical movement of the first floor portion and for maintaining the first floor portion horizontal.

14. The farrowing pen according to claim 13 wherein the base member is located at a height within the pit and below the side floor portions.

15. The farrowing pen according to claim 13 wherein the guide system comprises two pairs of levers arranged in a scissors arrangement with each pair on a respective side of the first floor portion.

* * * * *